(12) United States Patent
De Vocht et al.

(10) Patent No.: US 10,808,700 B2
(45) Date of Patent: Oct. 20, 2020

(54) METHOD AND DEVICE FOR CONTROLLING THE OIL TEMPERATURE OF AN OIL-INJECTED COMPRESSOR INSTALLATION OR VACUUM PUMP USING A FLOW DISTRIBUTOR

(71) Applicant: ATLAS COPCO AIRPOWER, NAAMLOZE VENNOOTSCHAP, Wilrijk (BE)

(72) Inventors: Kenneth De Vocht, Wilrijk (BE); Andries Jan F. Desiron, Wilrijk (BE)

(73) Assignee: ATLAS COPCO AIRPOWER, NAAMLOZE VENNOOTSCHAP, Wilrijk (BE)

(*) Notice: Subject to any disclaimer, the term of this patent is extended or adjusted under 35 U.S.C. 154(b) by 504 days.

(21) Appl. No.: 15/549,347

(22) PCT Filed: Feb. 3, 2016

(86) PCT No.: PCT/BE2016/000011
§ 371 (c)(1),
(2) Date: Aug. 7, 2017

(87) PCT Pub. No.: WO2016/127226
PCT Pub. Date: Aug. 18, 2016

(65) Prior Publication Data
US 2018/0283380 A1 Oct. 4, 2018

(30) Foreign Application Priority Data
Feb. 11, 2015 (BE) .................................. 2015/5077

(51) Int. Cl.
*F04C 29/00* (2006.01)
*F16K 11/08* (2006.01)
(Continued)

(52) U.S. Cl.
CPC ........ *F04C 29/0014* (2013.01); *F04C 29/026* (2013.01); *F04C 29/04* (2013.01);
(Continued)

(58) Field of Classification Search
CPC .. F04B 2207/03; F04B 39/0207; F04B 39/06; F04B 39/062; F04B 49/06;
(Continued)

(56) References Cited

U.S. PATENT DOCUMENTS 4,289,461 A * 9/1981 van Oorschot ..... F04C 29/0014
418/84
5,318,151 A * 6/1994 Hood .................... F04C 29/021
184/6.1
(Continued)

FOREIGN PATENT DOCUMENTS

BE 1016814 A3 7/2007
EP 1355095 A2 10/2003
(Continued)

OTHER PUBLICATIONS

English Machine Translation of KR20050074133A, translated by Espacenet, May 10, 2020. (Year: 2005).*
(Continued)

*Primary Examiner* — Patrick Hamo
*Assistant Examiner* — Paul W Thiede
(74) *Attorney, Agent, or Firm* — Bacon & Thomas, PLLC (57) ABSTRACT

A device for controlling the oil temperature of an oil-injected compressor installation with a compressor element that is provided with a gas inlet and an outlet for compressed gas that is connected to an oil separator that is connected by an injection pipe to the compressor element. A cooler is affixed in a part of the injection pipe that can be bypassed by means of a bypass pipe. The device is also provided with an extra pipe that is intended to be connected in parallel with (Continued)

the bypass pipe and the cooler, and in which an energy recovery system can be connected. Additionally, the device is provided with a flow distributor through the cooler, the bypass pipe and the extra pipe, and a controller for controlling these temperature control devices at the outlet of the compressor element.

17 Claims, 3 Drawing Sheets

(51) Int. Cl.
  *F04C 29/02* (2006.01)
  *F04C 29/04* (2006.01)
(52) U.S. Cl.
  CPC .......... *F16K 11/08* (2013.01); *F04C 2270/18* (2013.01); *F04C 2270/195* (2013.01); *F04C 2270/44* (2013.01)
(58) Field of Classification Search
  CPC .............. F04C 2270/195; F04C 29/021; F04C 29/026; F04C 29/042; F04C 2270/19; F16K 31/002; Y10T 137/6579; Y10T 137/7737; F01L 7/021
  USPC .................. 418/1, 191; 184/6.1; 417/53, 228
  See application file for complete search history.

(56) References Cited

U.S. PATENT DOCUMENTS

| | | |
|---|---|---|
| 9,441,638 B2 | 9/2016 | Takano et al. |
| 2005/0089432 A1 | 4/2005 | Truyens |
| 2015/0030468 A1* | 1/2015 | Martens .............. F04B 39/0207 417/53 |
| 2018/0135899 A1* | 5/2018 | Turner ...................... F25B 6/02 |

FOREIGN PATENT DOCUMENTS

| | | | |
|---|---|---|---|
| EP | 2299153 A1 | | 3/2011 |
| GB | 1384397 A | | 2/1975 |
| KR | 20050074133 A | * | 7/2005 |
| RU | 2013108170 A | | 8/2014 |
| WO | 2007/045052 A1 | | 4/2007 |

OTHER PUBLICATIONS

International Search Report (ISR) dated Nov. 3, 2016, for PCT/BE2016/000011.

* cited by examiner

METHOD AND DEVICE FOR CONTROLLING THE OIL TEMPERATURE OF AN OIL-INJECTED COMPRESSOR INSTALLATION OR VACUUM PUMP USING A FLOW DISTRIBUTOR

The present invention relates to a method and device for controlling the oil temperature of an oil-injected compressor installation or vacuum pump.

More specifically, the invention is intended to prevent the formation of condensate in compressed gas originating from an oil-injected compressor installation and to keep the oil temperature closer above the actual dew point.

BACKGROUND OF THE INVENTION

The invention can also be applied to vacuum pumps. After all, a vacuum pump is in fact a compressor installation whose input is connected to the vacuum pipe, reservoir or similar to be drawn.

Oil-injected compressor installations are already known that comprise a compressor element that is provided with a gas inlet and outlet for compressed gas, which is connected to an oil separator that is connected by means of an injection pipe to the aforementioned compressor element and whereby a cooler is affixed in the injection pipe that can be bypassed by means of a bypass pipe.

It is known that when compressing air, the moisture present in this air can condense under the influence of the pressure increase.

With an oil-injected compressor installation, the lubrication and cooling oil that is injected into the compressor installation can consequently become contaminated with condensate, which often leads to the degradation of this oil and wear of the various components of the compressor installation.

Moreover, the condensate can also cause corrosion in the compressor installation.

In order to prevent the formation of condensate, the temperature of the compressed gas in the compressor element and the underlying components is driven to above its dew point.

However, it must always be considered that the temperature in the compressor element and the underlying components at the outlet may not be too high, as too high a temperature causes a degradation of the cooling and lubrication properties of the oil.

BE 1.016.814 describes a device of the aforementioned type that makes use of this principle, whereby use is made of a flow distribution of the oil through the cooler and the bypass pipe, in order to bring the temperature of the lubricating and cooling oil to any desired value in this way so that the temperature of the compressed gas is also indirectly kept above its dew temperature.

A disadvantage of such a device is that the heat that is removed by the cooler of the system cannot be usefully utilised.

Systems are already known whereby an energy recovery system is integrated that enables the end user to recover heat from the oil, according to the energy requirement.

This energy recovery system can comprise a water circuit for example, whereby water is heated that can be usefully applied by the user.

As the energy recovery of the aforementioned system depends on the energy requirement of the end user, for example the quantity of hot water consumed, such a system is always applied in combination with a cooler as described above, whereby the oil is then driven to the cooler when it is not sufficiently cooled by the aforementioned energy recovery system.

Hereby use is made of two or more thermostatic valves that open or close depending on the temperature of the oil, in order to control the flow of the oil.

A disadvantage of such devices is that they require a complex and sizeable system with thermostatic valves.

An additional disadvantage of such thermostatic valves is that they can only switch at one temperature and consequently cannot respond to changes of the dew point.

As a result of this a relatively large safety margin will always be applied, whereby the oil is cooled to a relatively high temperature at a maximum in order to be able to accommodate any increase of the dew point without running the risk of condensation.

Another disadvantage of such known devices is that the cooler and the energy recovery system are in series with one another, i.e. all oil that passes through the cooler also passes through the energy recovery system.

It is possible that the energy recovery system heats the oil instead of cooling it, for example when the end user drives hot water through the energy recovery system, so that the cooler has to cool this extra heated oil.

However, the cooler is not equipped for this so that the oil can be insufficiently cooled, with the aforementioned detrimental consequences as a result.

SUMMARY OF THE INVENTION

The purpose of the present invention is to provide a solution to least one of the aforementioned and other disadvantages.

The object of the present invention is a device for controlling the oil temperature of an oil-injected compressor installation or vacuum pump with a compressor element that is provided with a gas inlet and an outlet for compressed gas that is connected to an oil separator that is connected by means of an injection pipe to the aforementioned compressor element, and whereby a cooler is affixed in a part of the injection pipe that can be bypassed by means of a bypass pipe, whereby the device is provided with an extra pipe that is intended to be connected in parallel with the bypass pipe and the cooler, and in which an energy recovery system can be connected, and the device is provided with flow distribution means through the cooler, the bypass pipe and the extra pipe, and a controller for controlling these temperature control means at the aforementioned outlet of the compressor element.

The part of the injection pipe in which the cooler is located means the section of the injection pipe that can be bypassed by the bypass pipe.

As already stated, the energy recovery system can comprise a heat exchanger in which water can circulate in order to extract heat from the oil. The thus obtained hot water can be usefully employed by the end user for heating, sanitary applications and similar.

Another advantage is that the cooler is placed in parallel with the energy recovery system such that, when the energy recovery system does not cool the oil but heats it, because the water in the heat exchanger is too hot, the controller can control the flow distribution means such that the oil can be guided directly to the cooler without first passing through the energy recovery system.

In this way the cooler is never exposed to oil that is additionally heated by the energy recovery system for which the cooler is not equipped.

Another advantage is that the cooler is placed in parallel with the energy recovery system, such that the pressure drop across the cooler and the energy recovery system is never completely added, while this would be the case with a serial connection. The reduced pressure drop is of essential importance for the good energy efficiency of the compressor.

Preferably the device is provided with means to determine the dew point at the outlet of the compressor element, whereby the controller determines the dew point on the basis of these means, and on the basis of this controls the flow distribution means, such that the temperature at the outlet is higher than the determined dew point, but less than the determined dew point plus a preset value.

An advantage is that by determining the dew point ad hoc or in real time, and controlling the flow distribution on the basis of this ad hoc determined dew point, it can respond to a changing dew point.

If the dew point becomes lower due to the changed valve position, more oil will flow along the cooling system such that the resulting mixed oil is cooler, taking account of the lower dew point. As a result the lifetime of the oil will increase.

Analogously if the dew point becomes higher, due to a changed valve position less oil will flow along the cooling system such that the resulting mixed oil is warmer, such that condensation can be prevented. With a conventionally applied thermostat, it is not possible to respond to this for as long as the dew point lies outside the operating region of the thermostat setpoint.

The invention also concerns a compressor installation or vacuum pump with an oil-injected compressor element, that is provided with a device according to the invention for controlling the oil temperature of an oil-injected compressor installation or vacuum pump.

According to the preferred design form, the invention also concerns a valve with a housing with a rotatable valve body and four connections of which a main connection can be configured as an input or output respectively, and the other connections, respectively a first, a second and a third connection, can be configured as an output or an input respectively, whereby the passages in the valve body are such that in three discrete rotary positions of the valve, respectively a first, a second and third position, the passage between the main connection and the first, second and third connection respectively is a maximum and whereby the valve is continuously movable between each of the aforementioned discrete positions, whereby due to the rotation from one discrete position to the next discrete position, the passage between the main connection and the connection concerned of the one discrete position decreases proportionally, while simultaneously the passage between the main connection and the connection concerned of the next discrete position increases proportionally.

Main connection here means the connection in which the entire flow arrives or from which the entire flow is distributed over the other remaining connections.

Such a valve can be applied in a device according to the invention, whereby the main connection can be connected to the injection pipe, and the remaining connections to the bypass pipe, the extra pipe for the energy recovery system and the part of the injection pipe in which the cooler is located, whereby due to the rotation between the different discrete rotated positions the oil flow will be distributed in order as it were.

Starting from the bypass pipe, the energy recovery system is first called upon and then the cooler, if there is a need for cooling the oil.

An additional advantage of such a valve is that there is always a passage through the valve, irrespective of the position of the valve.

Moreover, the flow that goes through the valve will always be the total flow, as when the passage between the main connection and the one connection decreases, the passage to the other connection increases just as much.

Upon application in a device according to the invention, this has the advantage that an oil supply to the compressor element will always be realised in order to be able to guarantee the lubrication and/or cooling.

The invention also concerns a method for controlling the oil temperature of an oil-injected compressor installation or vacuum pump with a compressor element that is provided with a gas inlet and an outlet for compressed gas that is connected to an oil separator that is connected by means of an injection pipe to the aforementioned compressor element and whereby a cooler is affixed in a part of the injection pipe that can be bypassed by means of a bypass pipe, whereby the method consists of providing an extra pipe in parallel with the bypass pipe and the cooler in which an energy recovery system can be affixed, whereby the method at least comprises the step of controlling the flow through the cooler, the bypass pipe and the extra pipe such that the temperature at the outlet of the compressor element falls within certain limits.

BRIEF DESCRIPTION OF THE DRAWINGS

With the intention of better showing the characteristics of the invention, a few preferred variants of a device and method according to the invention for controlling the oil temperature of an oil-injected compressor installation or vacuum pump, are described hereinafter by way of an example, without any limiting nature, with reference to the accompanying drawings, wherein.

DETAILED DESCRIPTION OF THE INVENTION

Figure 1:
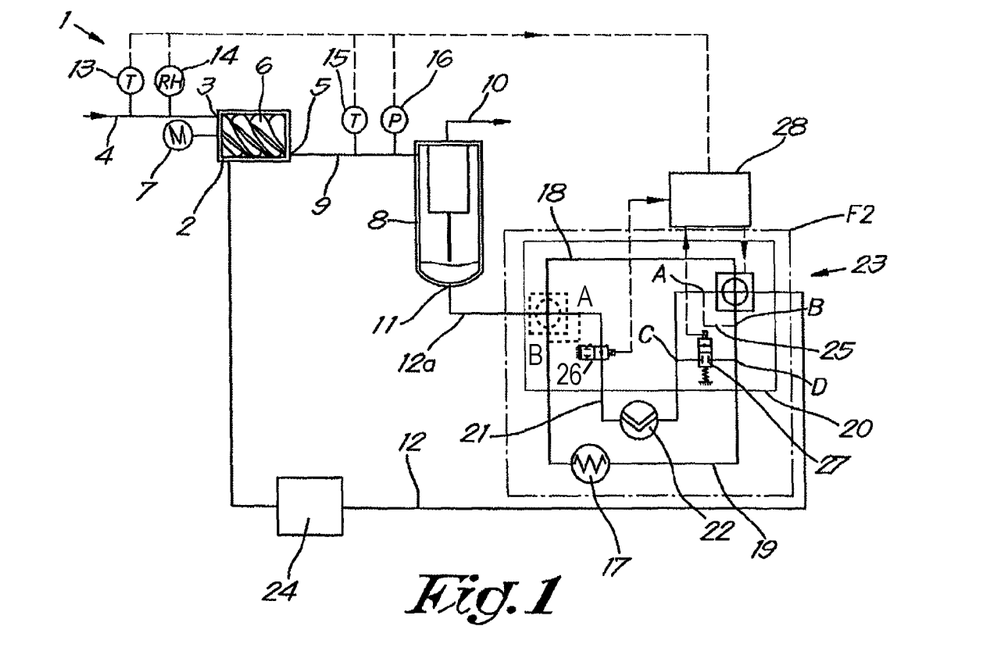
FIG. 1 schematically shows an oil-injected compressor installation according to the invention.

The oil-injected compressor installation 1 shown in FIG. 1 comprises an oil injected compressor element 2 that is provided with a gas inlet 3 with an inlet pipe 4 and an outlet 5 for compressed gas.

In this case the compressor element 2 is a screw compressor element with two meshed helical rotors 6 that are driven by means of a motor 7.

The aforementioned outlet 5 is connected to an oil separator 8 by means of a pressure pipe 9.

The oil separator 8 comprises a gas outlet 10, along which the purified and compressed gas can be carried to a pressure network or to consumers of compressed gas such as pneumatic tools for example.

The oil separator 8 also comprises an oil outlet 11 to be able to carry away the separated oil, whereby this oil outlet 11 is connected to an injection pipe 12 via an oil pipe 12a to be able to inject the oil back into the compressor element 2.

At the location of the inlet 3, in this case in the inlet pipe 4, means 13 respectively 14 are provided to be able to determine the temperature $T_{in}$ and the humidity $RH_{in}$ at the inlet 3, for example in the form of sensors.

At the location of the outlet 5, in this case in the pressure pipe 9, means 15 respectively 16 are provided to determine the temperature $T_{out}$ and pressure $p_{out}$ at the outlet 5, for example in the form of sensors.

A cooler 17 is provided in the injection pipe 12 that is bypassed by means of a bypass pipe 18. In other words: the cooler 17 is provided in first piping or the part 19 of the injection pipe 12 that is bypassed by the bypass pipe 18.

A device 20 according to the invention is also provided.

As shown in FIG. 1, in this case, but not necessarily, the aforementioned bypass pipe 18 is integrated in the aforementioned device 20.

The aforementioned part 19 of the injection pipe 12 is also integrated in the device 20.

Furthermore, the device 20 is provided with a secondary or extra pipe 21 that is connected in parallel with the bypass pipe 18 and the cooler 17.

An energy recovery system 22 is affixed in this extra pipe 21.

In the example shown in FIG. 1, the device 20 according to the invention is constructed as a type of "black box" to which the cooler 17, the energy recovery system 22, the oil pipe 12a and the injection pipe 12 can be connected. Hereby the connection of the oil pipe 12a to the device 20 can be considered as the inlet of the device 20, and the connection to the injection pipe 12 to the device 20 as the outlet of the device 20.

The device 20 is also provided with means 23 to distribute the oil flow, that is guided through the oil pipe 12a to the device 20, over the bypass pipe 18, the cooler 17 and the energy recovery system 22.

In this case the aforementioned means 23 are downstream from the cooler 17. This has the advantage that cooled oil passes through the aforementioned means 23 so that they are not exposed to warm or hot oil originating directly from the oil separator 8.

In the injection pipe 12, downstream from the device 20, an oil filter 24 is provided that that will filter out any impurities from the oil.

It is not excluded that the oil filter 24 is provided in the device 20 itself, whereby the oil filter 24 is preferably positioned downstream from the cooler 17, the extra pipe 21 and the bypass pipe 18.

A leakage flow 25 is also provided between a point A in the extra pipe 21, that is located between the flow distribution means 23 and the energy recovery system 22, and a point B that is located in the injection pipe 12, in this example more specifically in the part 19 of the injection pipe 12 in which the cooler 17 is located.

The point B is downstream from the cooler 17. However, if the flow distribution means 23 are located upstream from the cooler 17, as seen in the dotted flow distribution means in FIG. 1, the point B would also be upstream from the cooler 17.

It is also possible that the leakage flow 25 is realised from the extra pipe 21 to a point downstream from the flow distribution means 23 or even downstream from the device 20, but the embodiment with the leakage flow 25 integrated in the device 20 is preferable.

In the example shown in FIG. 1, the leakage flow 25 is at the location of the flow distribution means 23. It is not excluded that the leakage flow 25 is realised in the flow distribution means 23 itself.

The aforementioned leakage flow 25 is preferably small, i.e. less than 10% of the total oil flow, even better less than 5% of the total oil flow, and preferably even less than 1% of the total oil flow.

The device 20 is also provided with closing means 26 that enable the extra pipe to be closed if there is no energy recovery system 22. This can be constructed as a simple mechanical plug for example.

Furthermore, the device 20 is also provided with connecting means 27 that enable a connection to be formed between a point C in the extra pipe 21, that is located between the flow distribution means 23 and the location of the recovery system 22, and a point D in the injection pipe 19 between the cooler 17 and the flow distribution means 23. These connecting means 27 can also be constructed as a simple mechanical plug.

As an energy recovery system 22 is actually present in FIG. 1, the closing means 26 and the connecting means 27 are not operating.

Figure 2:
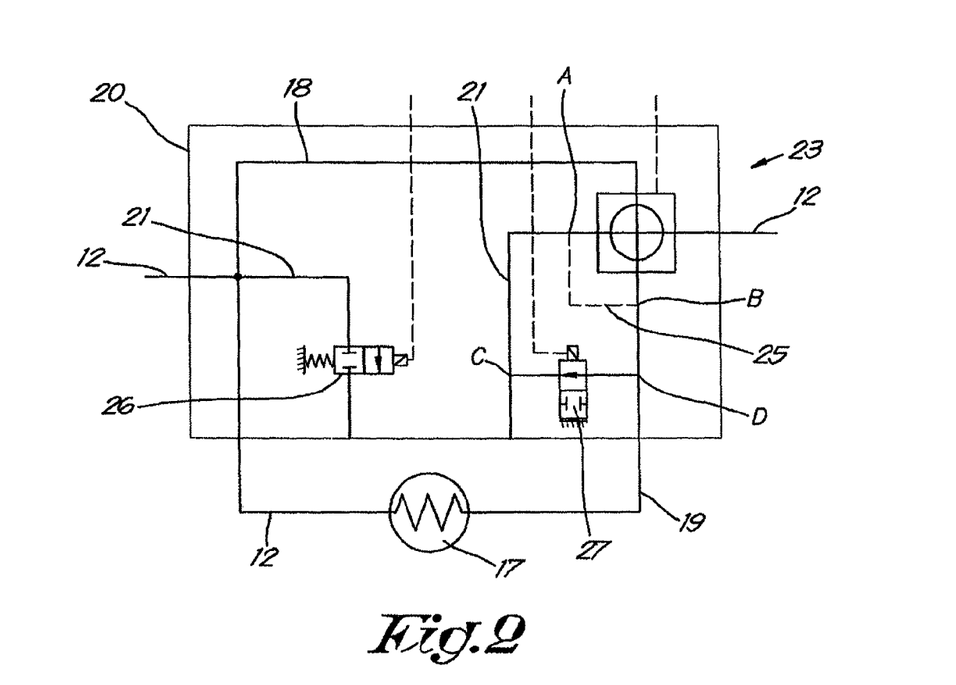
FIG. 2 shows an alternative embodiment of the section that is indicated by F2 in FIG. 1.

FIG. 2 shows an alternative embodiment of the device 20, whereby in this case there is no energy recovery system 22. Hereby the closing means 26 close off the extra pipe 21 and ensure the connecting means 27 for a connection between the points C and D, so that in this case the oil that passes through the cooler 17 is driven through the extra pipe 21 to the flow distribution means 23.

This has the advantage that the connections of the part 19 of the injection pipe 12 from the cooler 17 to the device 20 can always be realised in the same way, while the flow distribution means 23 only has to have half of the range and thus a fast control is preserved.

If the flow distribution means 23 are upstream from the cooler 17, the connection will ensure that oil that is driven through the aforementioned means 23 via the extra pipe 21 is guided to the cooler 17.

The compressor device 1 is also provided with a controller 28 that is connected to the means 13, respectively 14 to be able to determine the temperature $T_{in}$ and the humidity $RH_{in}$ at the inlet 3, and to the means 15 respectively 16 to be able to determine the temperature $T_{out}$ and pressure $p_{out}$ at the outlet 5, for example in the form of sensors.

The controller 28 is also connected to the flow distribution means 23 in order to be able to control it.

In this case, but not necessarily, the controller 28 is also connected to the closing means 26 and the connecting means 27, so that the controller 28 can determine the position of the closing means 26 and the connecting means 27.

Figure 3:
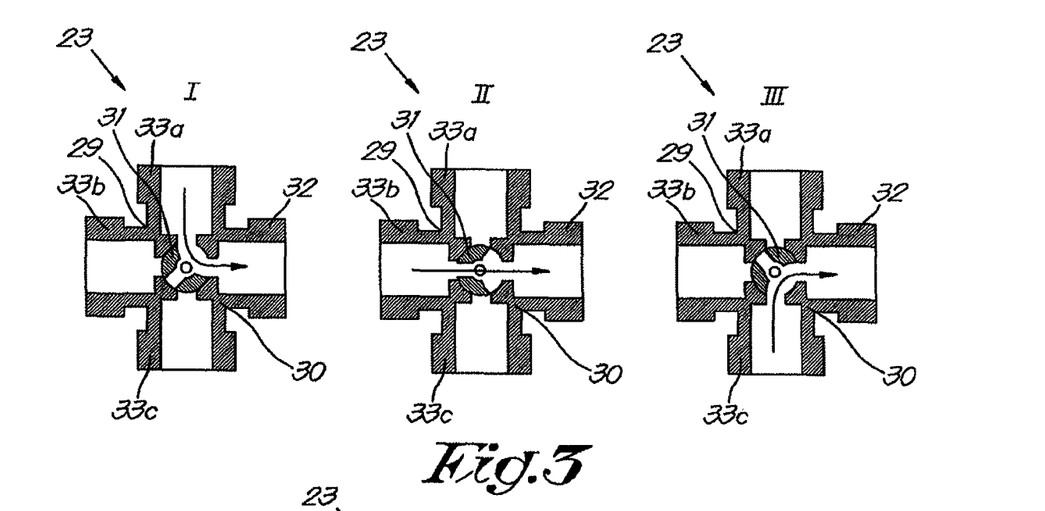
FIG. 3 schematically shows a valve which can be used in a device according to the invention in different positions.

FIG. 3 shows the flow distribution means 23. In this case they are constructed as valve 29 with a housing 30 in which a rotatable valve body 31 is affixed.

Four connections are provided. In this example, the main connection 32 acts as an output and is connected to the injection pipe 12. In other words, the main connection 32 will drive the resulting mixed flow to the injection pipe 12.

Of the other connections, which in this example are inputs, a first connection 33a is connected to the bypass pipe 18, a second connection 33b to the extra pipe 21, and a third connection 33c to the part 19 in which the cooler 17 is located.

According to the state of the art, passages are made in the valve body 31, so that in three discrete rotary positions of the valve 29, the passage between the main connection 32 and the other connections 33a-c is a maximum.

FIG. 3 shows the three discrete positions by I, II and III.

Between these three discrete positions the valve 29 is continuously rotatable, whereby due to the rotation from the one position to the next, the passage between the main connection 32 and one of the remaining connections 33a-c decreases, while simultaneously the passage between the main connection 32 and the other remaining connection 33a-c increases proportionally.

In this case this is realised by the four connections 32, 33a-c being in one plane at an angle of 90° to one another, or departing from this by a maximum of 5° or 10°, whereby the valve body 31 comprises a ring that can rotate in the housing 30 and which is provided with two cutaways in order to at least partially block one or more of the other connections 33a-c.

As can be seen in FIG. 3, the main connection 32 is always open.

It is clear that instead of the valve 29 of FIG. 3, a valve system or similar can also be used.

The valve 29 is further provided with an electric actuator, not shown in the drawings, that ensures the rotation of the valve body 31. The controller 28 is connected to this actuator to be able to control the position of the valve 29.

It is clear that this electric actuator can also be a pneumatic actuator or another type of motor.

Figure 4:
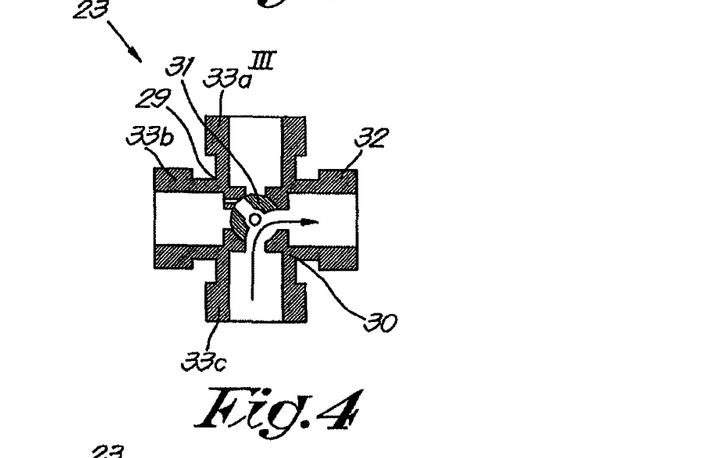
FIG. 4 schematically shows a variant of position III of FIG. 3.

It is also possible that the aforementioned leakage flow 25 is realised in the valve 29 itself. This is shown in FIG. 4 as an example for a valve 29 in position III.

Figure 5:
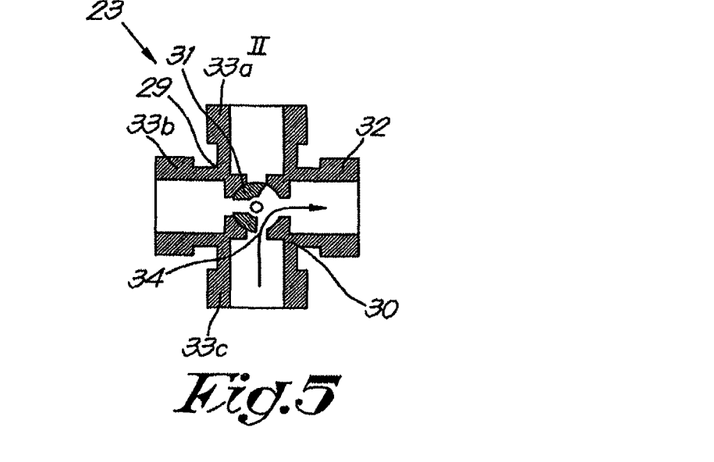
FIG. 5 schematically shows a variant of position II of FIG. 3.

An alternative to the connecting means 27 is shown in FIG. 5. The alternative consists of a valve 29 with an asymmetrically constructed valve body 31. The only difference to the valve 29 shown in FIG. 1 is the design of the valve body 31. The design of the valve body 31 is such that the passage between the main connection 32 and the connection 33a-c concerned of the one discrete position decreases, while simultaneously the passage between the main connection 32 and the connection 33a-c concerned of the next discrete position increases, whereby when the valve body 31 is in the second position, there is at least a partial passage 34 between the main connection 32 and the third connection 33c.

As a result, the situation can be realised that the part 19 of the injection pipe 12 with the cooler 17 is already open in position II of the valve 29 when the extra pipe 21 with the energy recovery system 22 is closed by means of the closing means 26. Such a valve 29 with an asymmetrically constructed valve body 31, as shown in FIG. 5, will only be applied when there is no energy recovery system 22 and the extra pipe 21 is closed.

The operation of the oil-injected compressor installation 1 is very simple and as follows.

During operation the motor 7 will drive the screw compressor element 2.

Due to the rotation of the helical rotors 6, gas, in this case air, will be drawn in via the gas inlet 3 and compressed by the helical rotors 6.

This compressed air will leave the screw compressor element 2 via the outlet 5 for compressed gas.

The gas is guided to the oil separator 8 where the oil is separated. The purified gas can then be carried away to a pressure network, pneumatic tools or similar.

The separated oil that is caught in the oil separator 8 is carried off by an injection pipe 12 to be injected into the screw compressor element 2 again to ensure the lubrication and cooling thereof.

If necessary the oil will be cooled by the cooler 17 and the energy recovery system 18, and purified by means of the oil filter 24.

To ensure that the oil is sufficiently cooled, but does not get too cold such that condensation can occur, the controller 28 will control the valve 29 according to a method according to the invention.

This method comprises the step of controlling the flow through the cooler 17, the bypass pipe 18 and if present the extra pipe 21 so that the temperature $T_{out}$ at the outlet 5 is within certain limits.

In order to determine these limits the controller 28 will make use of the ad hoc dew point.

The controller will determine the dew point on the basis of the signals from the means 13, 14 and 16, in other words on the basis of the temperature $T_{in}$ at the inlet, the pressure $p_{out}$ at the outlet and the humidity $RH_{in}$ at the inlet 3, using the known formulae.

It is important to note here that the dew point will be determined ad hoc, in other words in real time, so that the dew point that applies at that time is known at all times. As the dew point varies, the aforementioned determined limits will vary.

It has to be noted here that if the compressor device 1 is switched off or started up, use can be made of the set pressure at the outlet 5 to calculate the dew point instead of the current pressure $p_{out}$ at the outlet 5 to prevent the (detrimental) influence of the transitional phenomena on the determination of the dew point.

Furthermore, it is also possible that instead of the signal from the humidity sensor 14, use can be made of a setting that the humidity is 100%. This can be used for example in order to save on an extra sensor or if the sensor 14 is defective.

When the controller 28 has determined the dew point, it will control the temperature $T_{out}$ at the outlet 5 by controlling the flow through the cooler 17, the bypass pipe 18 and the extra pipe 21, so that the temperature $T_{out}$ at the outlet 5 is greater than the dew point, but is less than the dew point plus a preset value.

This preset value can be 10 degrees for example. By setting this upper limit, the temperature of the oil becoming too high can be prevented so that the cooling and lubricating properties of the oil are preserved and the lifetime of the oil is not reduced.

Preferably the controller 28 will control the temperature $T_{out}$ at the outlet 5 such that it is always higher than the dew point plus a certain value, for example 2 degrees or 1 degree. As a result a certain safety margin is built in to ensure that the temperature $T_{out}$ at the outlet 5 does not become too low.

In order to control the flow, the controller 28 will drive the valve 29, more specifically the controller 28 will rotate the valve body 31 in the valve 29.

When the temperature $T_{out}$ at the outlet 5 is greater than the dew point plus the preset value, the controller 28 will ensure that the valve body 31 rotates so that at least a part of the flow that goes through the bypass pipe 18, is driven through the extra pipe 21.

This means that in position I in FIG. 3, the valve body 31 will be rotated in the clockwise direction so that the valve body 31 will partly close the first connection 33a of the valve 29 so that the entire oil flow cannot pass through the bypass pipe 18, and simultaneously the second connection 33b will partially open so that a partial passage to the main connection 32 is realised so that a proportion of the oil flow can pass through the extra pipe 21 and the energy recovery system 22.

Figure 6:
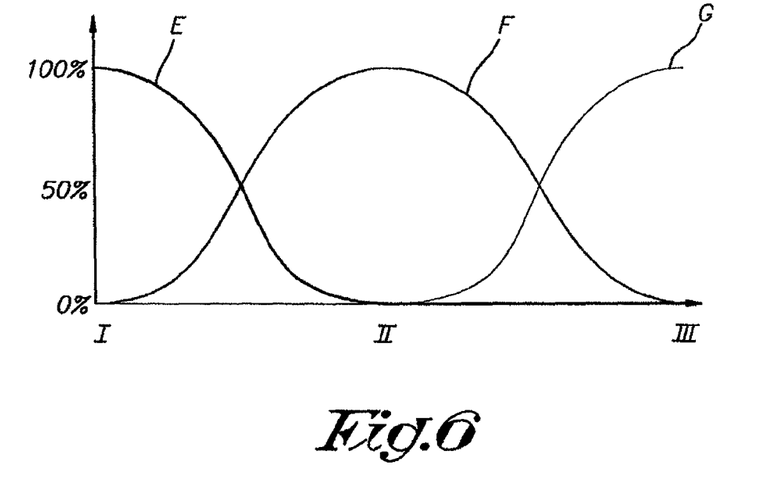
FIG. 6 schematically shows a graph of the flow through the valve of FIG. 3 in the different positions.

The variation of the oil flow via the bypass pipe 18, the cooler 17 and the energy recovery system 22 is schematically shown in the graph of FIG. 6, which clearly shows how the different flow rates vary due to the rotation of the valve body 31 from position I to position II. Curve presents the flow that passes via the first connection 33a and thus the bypass pipe 18, curve F presents the flow that passes via the second connection 33b and the energy recovery system 22, and curve G presents the flow rate that passes via the third connection 33c and the cooler 17.

The resulting mixed flow will be driven via the main connection 32 to the injection pipe 12 and the compressor element 2.

It must be noted here that the entire flow is always driven to the compressor element 2, as the passage to the second connection 33b increases proportionally to the decrease of the first connection 33a. This can also be derived from FIG. 6: the sum of the flows E, F and G is always 100% for each position of the valve 29.

As the oil that has passed through the energy recovery system 22 is normally cooled, the resulting mixed flow will also be cooler. This cooled oil will be injected into the compressor element 2 and ensure that the temperature $T_{out}$ at the outlet 5 can fall.

By further turning the valve body 31, more oil will be guided through the energy recovery system 22 and will be cooled more. Finally, the valve 29 will come to position II of FIGS. 3 and 4, whereby all oil is guided through the energy recovery system 22.

If the temperature $T_{out}$ at the outlet 5 is still too high, the controller 28 will gradually bring the valve 29 from position II to position III.

This means that only when all oil is guided through the energy recovery system 22 and more cooling is nonetheless required, oil will be driven through the cooler 17 by further turning the valve body 31.

If the temperature $T_{out}$ at the outlet 5 is too low, and in other words less cooling of the oil is required, the controller will rotate the valve body 31 in the anticlockwise direction. In this way, at least a part of the flow that goes through the cooler 17 will be driven through the extra pipe 21, and when the flow is driven through the extra pipe 21 the flow is driven at least partially through the bypass pipe 18 by rotating the valve body 31 further in the anticlockwise direction, if it turns out that the temperature $T_{out}$ is still too low.

If the temperature $T_{out}$ at the outlet 5 is too high and the energy recovery system 22 does not provide sufficient cooling of the oil, for example because the water in the system is too hot, the controller 28 will rotate the valve 29 to position III of FIGS. 3 and 4.

If this is the case, and the energy recovery system 22 nevertheless obtains more cooling capacity so that in principle it can provide sufficient cooling, the controller 28 will not be able to detect this on the basis of the signals from the sensors 13, 14, 15. The controller 28 will thus continue to drive the flow through the cooler 17, even though there is the possibility to recover heat from the oil.

It could be chosen to provide extra sensors in the energy recovery system 22, for example sensors that determine the temperature of the water in the energy recovery system 22, whereby on the basis of the signals from these extra sensors the controller 28 will turn the valve 29 back if it is detected that the energy recovery system 22 can cool the oil.

However, in the example shown a small leakage flow 25 is provided that will ensure that a small oil flow that is passed through the energy recovery system 22, is guided to the main connection 32 of the valve 29.

At the moment that the energy recovery system 22 can cool the oil, this small oil flow will be cooled and the final mixed flow will have a lower temperature.

By injecting this cooled mixed flow, the temperature $T_{out}$ at the outlet 5 will fall, such that finally the controller 28 will turn back the valve 29, so that the energy recovery system 22 can be utilised again.

In other words, by providing the leakage flow 25 the controller 28 will automatically turn back the valve 29 when the energy recovery system 22 can cool the oil.

If there is no energy recovery system 22, the device 20 will be modified as shown in FIG. 2.

Firstly the extra pipe 21 will be closed using the closing means 26, so that no oil can pass through the extra pipe 21.

The connecting means 27 will enable the oil that is passed through the cooler 17 to flow through the valve 29 via the second connection 33b. It is important to note here for example that the connection of the part 19 of the injection pipe 12, the oil pipe 12 and the injection pipe 12 to the device 20 will be done in the same way as in the example of FIG. 1.

This means that in this case, when the valve 29 is in position II, the oil that is passed through the cooler 17 is allowed through by the valve 29.

Even if the connecting means 27 are left out and the valve 29 as shown in FIG. 5 is used, the oil that passes through the cooler 17 will also be able to flow through the valve 29 via the third connection 33c when it is in position II. This is schematically shown in FIG. 5.

In these cases the controller 28 will only have to vary the valve 29 between position I and position II. In other words: the controller 28 will never vary the valve 29 to position III. In this way the valve 29 only needs half of the range and thus a rapid control is preserved.

If no connecting means 27 are provided, and a valve 29 as shown in FIG. 5 is not used, the valve 29 must vary between position I and position III, whereby it would always have to pass via position II. This of course has a detrimental effect on the speed of the control.

An additional advantage is that the device 20 can be very easily adapted and can still be adapted in the installation of the compressor device 1 on site, depending on whether or not an energy recovery system 22 is present.

The present invention is by no means limited to the embodiments described as an example and shown in the drawings, but such a method and device according to the invention to optimise the oil temperature of an oil-injected compressor installation can be realised according to different variants without departing from the scope of the invention.

The invention claimed is:

1. A device for controlling an oil temperature of an oil-injected compressor installation or vacuum pump with a compressor element comprising a gas inlet and an outlet for compressed gas that is connected to an oil separator, said oil separator comprising an oil outlet that is connected by injection piping to the compressor element, said device comprising:
   said injection piping,
   a bypass pipe,
   a first piping including a cooler provided in a part of the injection piping that is configured to be bypassed by the bypass pipe,
   a secondary pipe that is connected in parallel with the bypass pipe and the first piping including the cooler, and a flow distributor, said flow distributor for controlling oil flow through the injection piping through the first piping and the cooler, the bypass pipe and the secondary pipe, and a controller for controlling the flow distributor, wherein the flow distributor comprises a valve with a housing with a rotatable valve body and four connections of which a main connection is configured as an input or output respectively, and the other connections, respectively a first, a second and a third connection, are configured as an output or an input respectively, wherein passages in the valve body are such that in three discrete rotary positions of the valve, respectively a first, a second and third position, a passage between the main connection and the first, second and third connection respectively is a maximum, wherein the valve is continuously movable between each of the discrete positions, wherein due to the rotation from one discrete position to the next discrete position, the passage between the main connection and the connection of the one discrete position decreases proportionally, while simultaneously the passage between the main connection and the connection of the next discrete position increases proportionally, and wherein the main connection of the valve is connected to the injection piping, the first connection to the bypass pipe, the second connection to the secondary pipe, and the third connection to the part of an injection piping in which the cooler is located.

2. The device according to claim 1, wherein the flow distributor is downstream from the cooler.

3. The device according to claim 1, wherein the device is provided with means to determine a dew point at the outlet of the compressor element, wherein the controller determines the dew point on the basis of said means, and on the basis of the dew point controls the flow distributor such that the temperature at the outlet of the compressor element is higher than the determined dew point, but less than the determined dew point plus a preset value.

4. The device according to claim 3, wherein the means to determine the dew point at the outlet of the compressor element comprise one or more of the following sensors and/or signals:

a temperature sensor to determine the temperature at the inlet of the compressor element;

a pressure sensor to determine the pressure at the outlet of the compressor element or, or at least during the start up and switch off of the compressor installation or vacuum pump, a signal that the pressure at the outlet of the compressor element is equal to a set pressure;

a humidity sensor to determine the humidity of the gas at the inlet of the compressor element or a signal that the humidity is 100%.

5. The device according to claim 3, wherein the controller controls the flow distributor such that the temperature at the outlet of the compressor element is higher than the determined dew point plus a certain value.

6. The device according to claim 1, wherein the device is provided with an oil filter that is downstream from the cooler, the secondary pipe and bypass pipe.

7. A compressor installation or vacuum pump with an oil-injected compressor element, wherein the compressor installation or vacuum pump comprises a device according to claim 1 for controlling the oil temperature of the oil-injected compressor installation.

8. A device for controlling an oil temperature of an oil-injected compressor installation or vacuum pump with a compressor element comprising a gas inlet and an outlet for compressed gas that is connected to an oil separator, said oil separator comprising an oil outlet that is connected by injection piping to the compressor element, said device comprising:

said injection piping, a bypass pipe, a cooler provided in a part of the injection piping that is configured to be bypassed by the bypass pipe, an energy recovery system, a secondary pipe that is connected in parallel with the bypass pipe and the cooler, and in which the energy recovery system is connected, and a flow distributor, said flow distributor for controlling oil flow through the injection piping through the cooler, the bypass pipe and the secondary pipe, and a controller for controlling the flow distributor, wherein the flow distributor comprises a valve with a housing with a rotatable valve body and four connections of which a main connection is configured as an input or output respectively, and the other connections, respectively a first, a second and a third connection, are configured as an output or an input respectively, wherein passages in the valve body are such that in three discrete rotary positions of the valve, respectively a first, a second and third position, a passage between the main connection and the first, second and third connection respectively is a maximum, wherein the valve is continuously movable between each of the discrete positions, wherein due to the rotation from one discrete position to the next discrete position, the passage between the main connection and the connection of the one discrete position decreases proportionally, while simultaneously the passage between the main connection and the connection of the next discrete position increases proportionally, and wherein the main connection of the valve is connected to the injection piping, the first connection to the bypass pipe, the second connection to the secondary pipe, and the third connection to the part of an injection piping in which the cooler is located.

9. The device according to claim 8, wherein the main connection acts as an output and the first connection, the second connection, and the third connection as an input, wherein the first connection, the second connection, and the third connection are connected to the bypass pipe, the cooler and the secondary pipe, and wherein the main connection drives a resulting mixed flow to the injection piping.

10. The device according to claim 8, wherein a leakage flow is provided between a point in the secondary pipe that is located between the flow distributor and the energy recovery system and a point that is located in the injection piping, either upstream from the cooler if the flow distributor is upstream from the cooler, or downstream from the cooler if the flow distributor is downstream from the cooler.

11. The device according to claim 8, wherein the device is provided with closing means that enable the secondary pipe to be closed if the energy recovery system is not connected, and with connecting means that enable a connection to be formed between a point in the secondary pipe, that is located between the valve and the location of the energy recovery system, and a point in the injection piping that is located between the cooler and the valve such that, if the valve is upstream from the cooler, a flow that is driven through the secondary pipe is guided to the cooler or such that, if the valve is downstream from the cooler, a flow that is passed through the cooler is driven through the secondary pipe to the valve,     wherein, when the energy recovery system is not connected, the controller controls the valve such that the passage between the main connection and the connection that is connected to the cooler remains fully closed.

12. A method for controlling an oil temperature of an oil-injected compressor installation or vacuum pump with a compressor element that is provided with a gas inlet and an outlet for compressed gas that is connected to an oil separator comprising an oil outlet that is connected by means of an injection piping to the compressor element and wherein a cooler is affixed in a first piping which is a part of the injection piping that is able to be bypassed by means of a bypass pipe, wherein the method comprises the steps of:

providing a secondary pipe in parallel with the bypass pipe and the first piping including the cooler in which an energy recovery system is able to be affixed, and     controlling a flow of oil through the first piping and the cooler, the bypass pipe and the secondary pipe using a flow distributor such that a compressed gas temperature at the outlet of the compressor element falls within dew point limits,     wherein during the step of controlling the flow, a control is applied as follows:

if the temperature at the outlet is higher than a first set value, at least a part of the flow that goes through the bypass pipe is driven through the secondary pipe, and only when all the flow goes through the secondary pipe and the temperature at the outlet is still higher than the first set value, the flow is at least partially guided through the cooler;

if the temperature at the outlet is lower than a second set value, at least a part of the flow that goes through the cooler is driven through the secondary pipe, and only when all the flow goes through the secondary pipe and the temperature at the outlet is still lower than the second set value, the flow is at least partially guided through the bypass pipe.

13. The method according to claim 12, wherein the method comprises the following steps:

determining a dew point at the outlet of the compressor element;

controlling a flow through the cooler, the bypass pipe and the secondary pipe such that the temperature at the outlet of the compressor element is higher than the determined dew point, but lower than the determined dew point plus a preset value.

14. The method according to claim 13, wherein during the step of controlling the flow, the control is such that the temperature at the outlet of the compressor element is higher than the determined dew point plus a certain value.

15. The method according to claim 12, wherein the method comprises the step of providing a leakage flow between a point in the secondary pipe and the part of the injection piping in which the cooler is located, wherein this leakage flow occurs between the cooler and the flow distributor.

16. The method according to claim 12, wherein a valve is provided for controlling the flow through the cooler, the bypass pipe and the secondary pipe, wherein the valve comprises a housing with a rotatable valve body and four connections of which a main connection is able to be configured as an input or output respectively, and the other connections, respectively a first, a second and a third connection, are able to be configured as an output or an input respectively,     wherein passages in the valve body are such that in three discrete rotary positions of the valve, respectively a first, a second and third position, the passage between the main connection and the first, second and third connection respectively is a maximum,     wherein the valve is continuously movable between each of the aforementioned discrete positions,     wherein due to the rotation from one discrete position to the next discrete position, the passage between the main connection and the connection of the one discrete position decreases proportionally, while simultaneously the passage between the main connection and the connection of the next discrete position increases proportionally, and     wherein the main connection of the valve is connected to the injection piping, the first connection to the bypass pipe, the second connection to the secondary pipe, and the third connection to the part of an injection piping in which the cooler is located,     and that, when the energy recovery system is not connected, the method comprises the step of closing the secondary pipe and connecting a point in the secondary pipe, that is located between the valve and the location of the energy recovery system, and a point located in the injection piping between the cooler and the valve such that, if the valve is upstream from the cooler, the flow that is driven through the valve via the secondary pipe is guided to the cooler or such that, if the valve is downstream from the cooler, the flow that passes through the cooler is driven to the valve via the secondary pipe, and     wherein the method consists of controlling the valve during the control of the flows, such that the valve varies between the first and the second discrete position.

17. The method according to claim 12, wherein a valve is provided for controlling the flow through the cooler, the bypass pipe and the secondary pipe, wherein the valve comprises a housing with a rotatable valve body and four connections of which a main connection is able to be configured as an input or output respectively, and the other connections, respectively a first, a second and a third connection, are able to be configured as an output or an input respectively,     wherein the passages in the valve body are such that in three discrete rotary positions of the valve, respectively a first, a second and third position, the passage between the main connection and the first, second and third connection respectively is a maximum,     wherein the valve is continuously movable between each of the aforementioned discrete positions,     wherein due to the rotation from one discrete position to the next discrete position, the passage between the main connection and the connection of the one discrete position decreases, while at the same time the passage between the main connection and the connection of the next discrete position increases,     wherein the valve body is such that when it is in the second position there is at least a partial passage between the main connection and the third connection and wherein the main connection of the valve is connected to the injection piping, the first connection to the bypass pipe, the second connection to the secondary pipe, and the third connection to the part of the injection piping in which the cooler is located,
wherein when the energy recovery system is not connected, the method comprises the step of closing the secondary pipe, and wherein the method consists of controlling the valve during the control of the flows such that the valve is varied between the first and the second discrete position.

* * * * *